United States Patent
Jamar

[19]

[11] Patent Number: 6,046,713
[45] Date of Patent: *Apr. 4, 2000

[54] COLOR DISPLAY DEVICE INCLUDING ELECTRON BEAM DEFLECTION ARRANGEMENT FOR LANDING-CORRECTION

[75] Inventor: Jacobus H. T. Jamar, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/708,158

[22] Filed: Aug. 27, 1996

[30] Foreign Application Priority Data

Aug. 29, 1995 [EP] European Pat. Off. ............. 95202330
May 17, 1996 [EP] European Pat. Off. ............. 96201395

[51] Int. Cl.$^7$ ..................................................... G09G 1/08
[52] U.S. Cl. .......................... 345/13; 345/14; 315/368.26; 313/413
[58] Field of Search .................................. 345/10, 13, 14; 313/413, 428, 431; 315/368.11, 368.17, 368.26, 368.28, 364, 370

[56] References Cited

U.S. PATENT DOCUMENTS

| | | | |
|---|---|---|---|
| 3,912,970 | 10/1975 | Chandler et al. ...................... | 315/370 |
| 4,749,918 | 6/1988 | Fischer ................................. | 315/368.26 |
| 4,763,040 | 8/1988 | Vink et al. ............................... | 313/428 |
| 4,845,401 | 7/1989 | Shimoma et al. ...................... | 313/413 |
| 4,857,796 | 8/1989 | Amano et al. .......................... | 313/428 |
| 4,866,336 | 9/1989 | Sluyterman ............................ | 313/431 |
| 5,017,843 | 5/1991 | Barten ................................... | 315/368.11 |
| 5,027,042 | 6/1991 | Sluyterman et al. ................... | 315/368 |
| 5,041,764 | 8/1991 | Midland et al. .............. | 315/368.17 X |
| 5,339,010 | 8/1994 | Urata et al. ........................ | 315/368.17 |
| 5,355,050 | 10/1994 | Sluyterman ............................ | 313/440 |
| 5,519,281 | 5/1996 | Jamar .................................... | 313/413 |
| 5,585,690 | 12/1996 | Misono ................................... | 313/413 |

FOREIGN PATENT DOCUMENTS

| | | |
|---|---|---|
| 0507383 | 10/1992 | European Pat. Off. . |
| 0600540 | 6/1994 | European Pat. Off. . |
| 9202033 | 2/1992 | WIPO . |

*Primary Examiner*—Dennis-Doon Chow
*Assistant Examiner*—Amr Awad
*Attorney, Agent, or Firm*—Robert J. Kraus

[57] ABSTRACT

A color display device including a shadow mask and a correction deflection system for correcting landing-errors. The correction deflection system comprises first and second correction deflection devices which are arranged one behind the other in the direction of the electron beams and are energizable in opposite senses so that the first correction deflection device generates a dipole field deflecting the three electron beams away from the longitudinal tube axis, and the second correction deflection device generates a dipole field deflecting the three electron beams towards the longitudinal tube axis, or conversely.

17 Claims, 8 Drawing Sheets

COLOR DISPLAY DEVICE INCLUDING ELECTRON BEAM DEFLECTION ARRANGEMENT FOR LANDING-CORRECTION

BACKGROUND OF THE INVENTION

This invention relates to a color display device comprising a color display tube provided with a deflection unit, an electron source for generating three electron beams, a phosphor screen and an interpositioned shadow mask, said device further comprising means for correcting landing-errors.

Color display tubes have a phosphor screen with discrete areas each emitting light of a given color. For example, red light is emitted when a "red" electron beam impinges upon an area emitting red light (dot, strip or other geometrical shape). To prevent excitation of other areas by the "red" beam, a shadow mask provided with a pattern of apertures is used. It is positioned in such a way that the "red" electron beam passes the apertures at a given angle so as to impinge upon the red areas, while the other light-emitting areas are shielded from the red beam by the fixed parts of the mask. In a comparable manner, a "blue" electron gun produces a "blue" electron beam which passes the apertures at a slightly different angle so as to impinge only upon phosphors which emit blue light. The same applies to green light.

To produce light in areas which are remote from the centre of the face plate of the tube, the deflection unit is energized. The electron paths are thereby curved gradually, but the effect is as if they are bent at an acute angle at points which are known as color centres and are located on the lines of intersection of the undeflected paths and a hypothetical deflection plane; thus there is a red, a green and a blue color centre. It will be evident that a line drawn from a color centre through a shadow mask aperture must also pass through a phosphor dot which emits light whose color corresponds to that of the color centre in question. Displacement of either the color centre, the shadow mask (and its apertures), or the phosphor areas may cause an electron beam to impinge upon areas emitting a different color than the desired color, i.e. the beam lands incorrectly. The extent of displacement of an electron spot on the phosphor screen without a spot landing on an area having the wrong color is referred to as a guardband.

Landing-errors in shadow mask tubes are the result of manufacturing tolerances, influences of (earth's) magnetic fields, and doming. To prevent these errors from leading to color and luminance errors, a given extent of guardband is built into the design of the tube. However, this is detrimental to the total luminance.

Thus, by preventing or correcting the landing-errors, a considerable advantage can be obtained.

It is known that landing-errors in shadow mask tubes can be corrected by means of a current through an extra dipole (2-pole-x) coil system with which a transversal field is generated, "transversal" meaning transverse to the z-direction. A field in the y direction has, for example, an influence on the electron paths in the x direction and is therefore called "2-pole-x" field. A field in the x-direction is called a 2-pole-y field.

Upon energizing the 2-pole-x coil system, convergence and raster errors in both the x and the y direction are produced as side effects. The x raster error is the largest, but in practical cases, many of, in some cases all of these errors are found to be unacceptable if it is necessary to control a coil system for generating a useful extent of landing-correction (for example, 40 μm in a 32 inch Wide Screen tube).

SUMMARY OF THE INVENTION

It is an object of the invention to provide a solution to the above mentioned problems.

To this end the color display device is provided with a dipole coil system to generate a transversal field for correcting landing errors and means to correct raster and/or other errors introduced by the dipole coil system. Hereby the landing errors can be corrected, and the problems caused by the application of the dipole coil system are also avoided.

In an embodiment of the invention, a solution for avoiding these problems is to shift the video signal by means of a video memory. The color display device of the type described in the opening paragraph is thereto provided with a dipole coil system to generate a transversal field and with a supply means to supply video information to the source for generating the three electron beams, which supply means comprise means to advance or delay the video signal to the source.

In the video shift option, use is made of the fact that the normal deflection will bring back the beam to its original position on the screen, albeit at a slightly different point in time. The landing errors are, in the video shift option, corrected by advancing or delaying the video signals in time in proportion to an error correction signal. The realization of this option requires electronically delaying the video signal in correspondence with an error signal. The error signal is in a first order approximation determined by the transversal field generated in the 2-pole x coil system (or 2-pole y coil system), so in first order approximation the shift is a function of the transversal field generated by the 2-pole x coil system (or 2-pole y system). In an embodiment the means to supply comprise means for receiving a signal from the 2-pole x (y) system, and means for determining the advance or delay of the video signal in reaction to the signal received from the 2-pole x (y) system. Although the video shift option is a solution to the problems, by present lack of inexpensive electronic components (IC's) in particular for CRT's with higher video rates, such as 100 Hz TV's and computer monitors, this solution can as yet be realized only at a relatively high cost. However, as advances are made in IC technology which will bring more processing power at lower costs, this solution will become an attractive solution.

In a second embodiment of the invention an alternative solution to the mentioned problems (reduction of the side effects of the 2-pole x (y) system) is provided which does not require the use of a video shift, is simpler to implement and is, at least at present, realizable at lower costs.

To this end, a color display device of the type described in the opening paragraph is, in embodiments of the invention, characterized in that the correction means comprise first and second x-correction deflection devices which are arranged one behind the other in the direction of the electron beams and are energizable in opposite senses so that the first correction deflection device generates a dipole field deflecting the three electron beams away from the longitudinal tube axis, and the second correction deflection device generates a dipole field deflecting the three electron beams towards the longitudinal tube axis (or conversely, dependent on the direction of the desired variation of the landing-angle).

Instead of providing one dipole coil system, it is therefore proposed to provide two dipole coil systems at different positions along the longitudinal axis of the tube. In this way, the side effects of the two coil systems appear to compensate each other substantially. This applies to most of the above-mentioned side effects.

Manipulations in the video signal are then no longer necessary.

The first dipole bends the electron beam to one side and the second dipole bends the beam back again. Consequently, the beam lands on the correct screen position, but at a different, corrected (landing) angle.

An alternative to performing landing-correction by means of a double dipole coil system is to have the function of one of the two dipole coil systems fulfilled by (an extra modulation of the current in) the horizontal deflection coil itself. This can be realized by means of existing electronic components. The position of the extra dipole coil system can be optimized by placing this system closer to the phosphor screen than in the previous case and by possibly adding six-pole (or even ten-pole and fourteen-pole) field components to the dipole field. Manipulations in the video signal are also not necessary in this embodiment. In fact, the color display device according to the invention operates in such a way that the correction means apply such correction signals to the correction deflection devices that the correction deflections jointly realize a correct landing-position and electron beam angle.

As will be further explained, the correction deflection devices may be integrated in the deflection unit in different ways within the scope of the invention. More particularly, they may be arranged on the support of the main deflection coils at an axial position which is completely or partly within the line-field deflection coils.

Embodiments of the invention in which the dipole coil systems or system generates fields which deflect the electron beams in a direction parallel to the in-line plane relate to 2-pole-x system(s). In tubes in which the y-landing also plays a role, such as tubes having a hexagonal mask, a 2-pole-y system may be used alone or in combination with the 2-pole-x system described above. Landing errors in the y-direction can thereby be reduced. To this end an embodiment of the invention is characterized in that the correction means comprise first and second y-correction deflection devices which are arranged one behind the other in the direction of the electron beams and are energizable in opposite senses so that the first correction deflection device generates a dipole field deflecting the three electron beams away from the in-line plane, and the second correction deflection device generates a dipole field deflecting the three electron beams towards the in-line plane, or conversely. In such tubes, therefore, two y-dipoles are generated in operation where the first y-dipole field deflects the electron beams away from the in-line plane, and the second y-dipole deflects the three electron beams towards the in-line plane, or conversely.

A y-dipole is a dipolar field basically in the x-direction which deflects the electron beams out of the x-z plane, which plane corresponds to the so-called in-line plane for electron guns generating three in-line electron beams. Opposing y-dipoles deflect the electron beams above and below said plane or conversely, whereby a y landing correction is effected. The first dipole bends the electron beams out of the plane, and the second bends them back towards the plane. Consequently the beams land on the correct screen position, but at a different corrected landing angle in the y-direction.

Preferably, the two aspects of the invention are combined, i.e. the first and second correction deflection devices comprise systems to generate opposing x and y dipoles.

In a further preferred embodiment of both aspects of the invention the color display device comprises means to generate x or y quadruple field components in addition to the dipole fields. Using quadruple fields in either the x- or y-direction it is possible to significantly improve the corrections. More in particular convergence errors introduced by the application of the correcting x- and/or y dipoles can be strongly reduced.

Preferably both x and y quadruple fields components are produced in operation.

These and other aspects of the invention will be apparent from and elucidated with reference to the embodiments described hereinafter.

DESCRIPTION OF THE PREFERRED EMBODIMENTS

Figure 1:
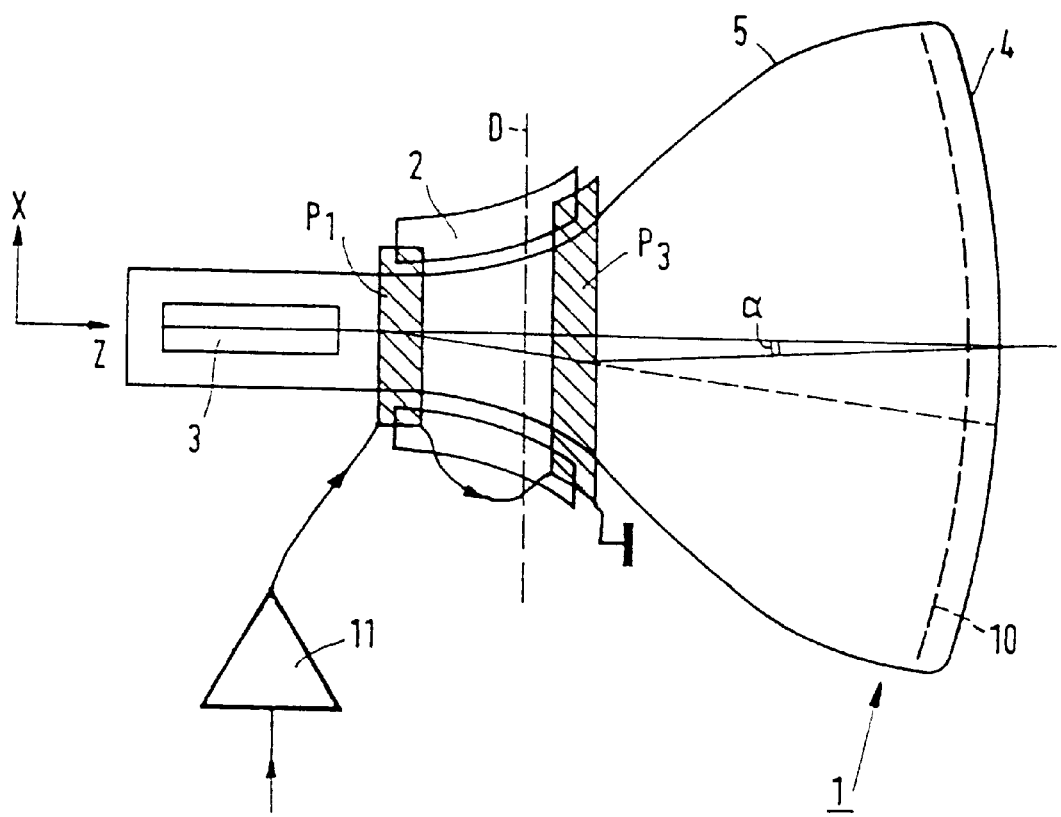
FIG. 1 shows diagrammatically the principle of the invention with reference to a display tube, using two extra dipole coil systems.

FIG. 1 is a plan view of a color display tube 1 with a deflection unit 2. A signal for landing-correction of the three electron beams produced by an electron gun 3 on the display screen 4 is added to a first dipole coil system having two correction coils P1, P2 (only P1 is visible in the Figure) arranged opposite each other at both sides of the x-z plane on the tube envelope, and a second dipole coil system comprising two correction coils P3, P4 arranged opposite each other at both sides of the x-z plane on the tube envelope and at some distance from each other in the z-direction, preferably one at each side of the deflection plane D. System P1, P2 deflects the beams to one side (away from the longitudinal tube axis Z) and system P3, P4 deflects the beams to the other side (towards the longitudinal tube axis Z) so that the beams land at the correct position on the display screen 4 but at a different, corrected (landing) angle.

Figure 8:
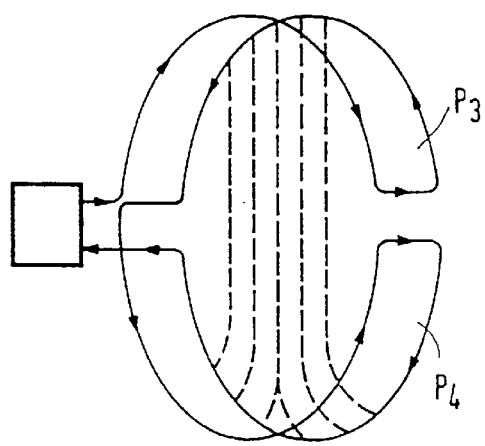
FIG. 8 shows diagrammatically (the operation of) a dipole deflection coil system.

FIG. 8 shows a dipole coil system for deflection in the (horizontal) direction.

In the implementation of the principle described above, the following items are important.

1) The position of the two dipoles and the intensity ratio should be chosen to be such that the side effects compensate each other as much as possible. To achieve this, it appears that the dipoles should preferably be placed fairly far towards the screen side. An example is shown in FIG. 2.

Figure 3:
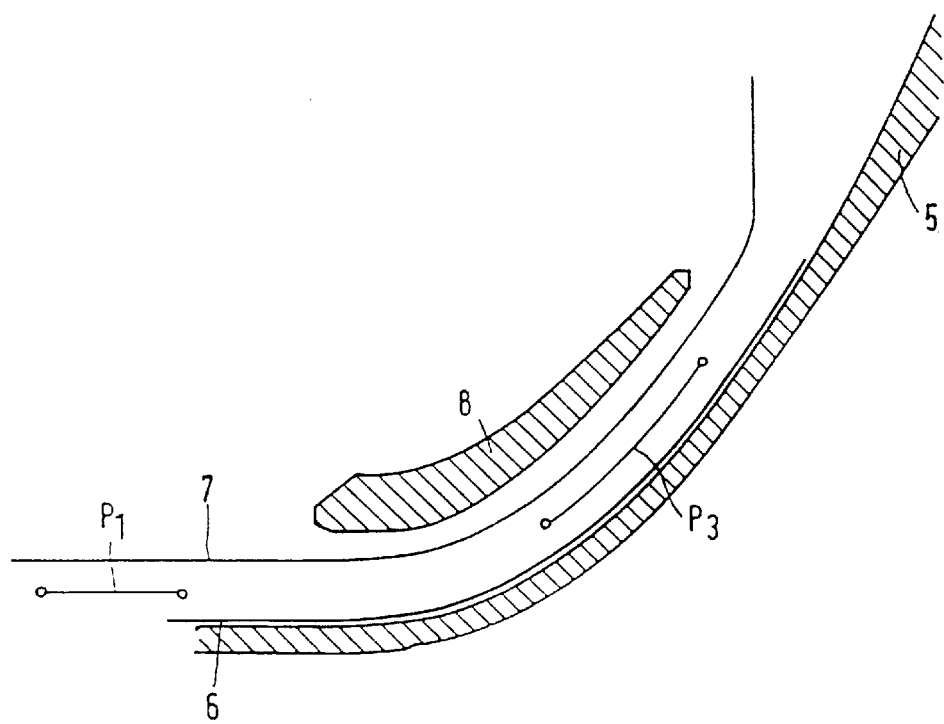
FIGS. 3 and 4 are cross-sections of a second and a third embodiment of the position of the extra coil systems shown in FIG. 1.
Figure 4:
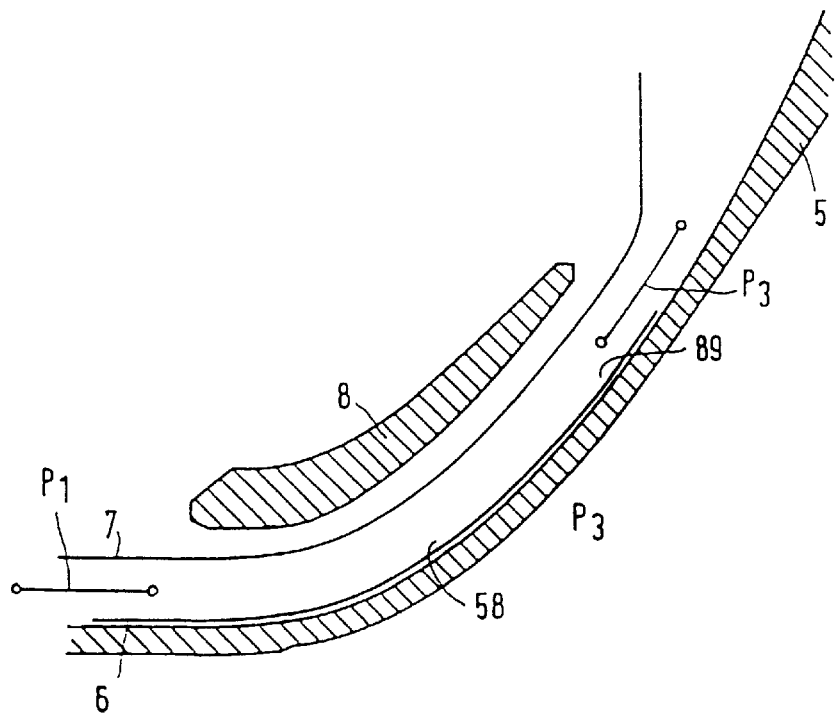

2) The mutual distance should preferably be as large as possible (then a relatively small extent of energization is necessary for a given landing-correction). This is of course slightly contradictory to item 1. A suitable compromise is shown in, for example, FIG. 3 or FIG. 4.
3) The side effects can still be corrected by not implementing the coils as genuine dipoles but by adding 6-pole (and possibly even 10 and 14-pole) components. These components are chosen separately for each dipole.
4) It is practicable to arrange the two dipoles in series. The system is connected to an electronic circuit (current source) which passes the right correction current through the system, for example, for each screen area or screen point.
5) The line deflection coil system is magnetically coupled to the 2-pole-x system, respectively the field deflection coil is coupled to the 2-pole-y system, and a voltage is induced in the 2-pole-x or 2-pole-y system. This should be taken into account in the construction of the circuit, for example, by generating an opposite voltage in the dipole circuit by means of an extra trafo ("12" in FIG. 7).

Figure 2:
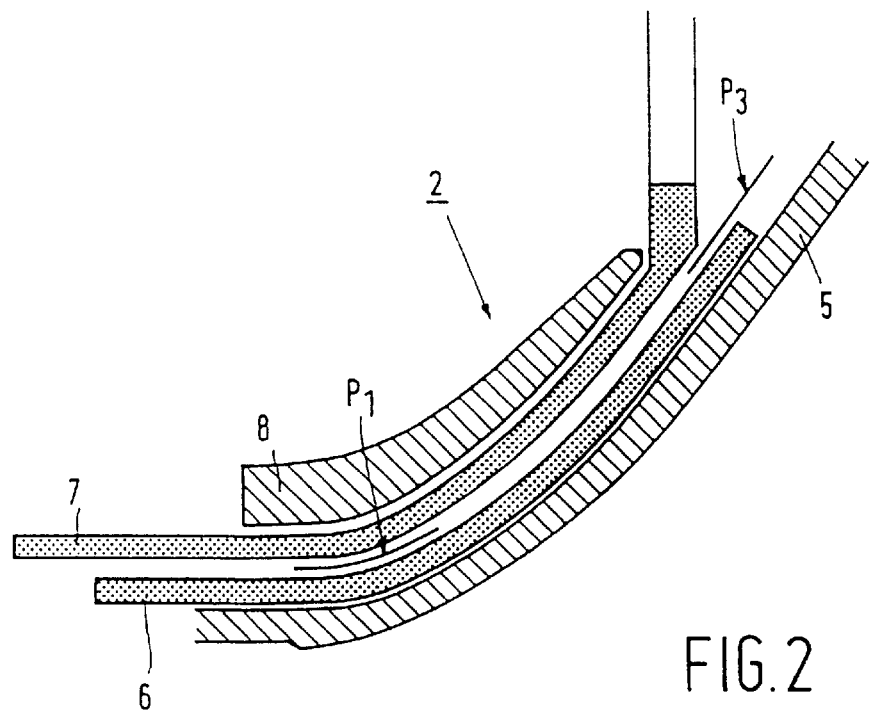
FIG. 2 is a cross-section of a first embodiment of the position of the extra coil systems shown in FIG. 1.

FIG. 2 shows in greater detail a cross-section through a part of a display tube having a glass envelope 5 which supports a deflection unit 2. Deflection unit 2 comprises a line deflection coil system 6 and a field deflection coil system 7 surrounded by a magnetic core 8. In the situation shown in FIG. 2, a first dipole deflection system P1, P2 (only "P1" is visible) is arranged between the line deflection coil system 6 and the field deflection coil system 7 at a position within the magnetic core 8. A second dipole deflection system P3, P4 (only P3 is visible) is arranged more to the front in the axial direction (in this sample at the position on the outer side of the line deflection coil system 6, just in front of the field deflection coil system 7).

For good results it has appeared to be practical to space the two dipole coil systems at least 3 cm apart (as in the above-mentioned prototypes), with the front system being arranged at least partly under the yoke ring. The centre of the rear system is preferably not located behind the front end of the focusing lens of the electron gun, and the coils of the dipole systems in the Z direction are as long as possible. This of course depends on the design of the deflection unit in which they are used.

Figure 5:
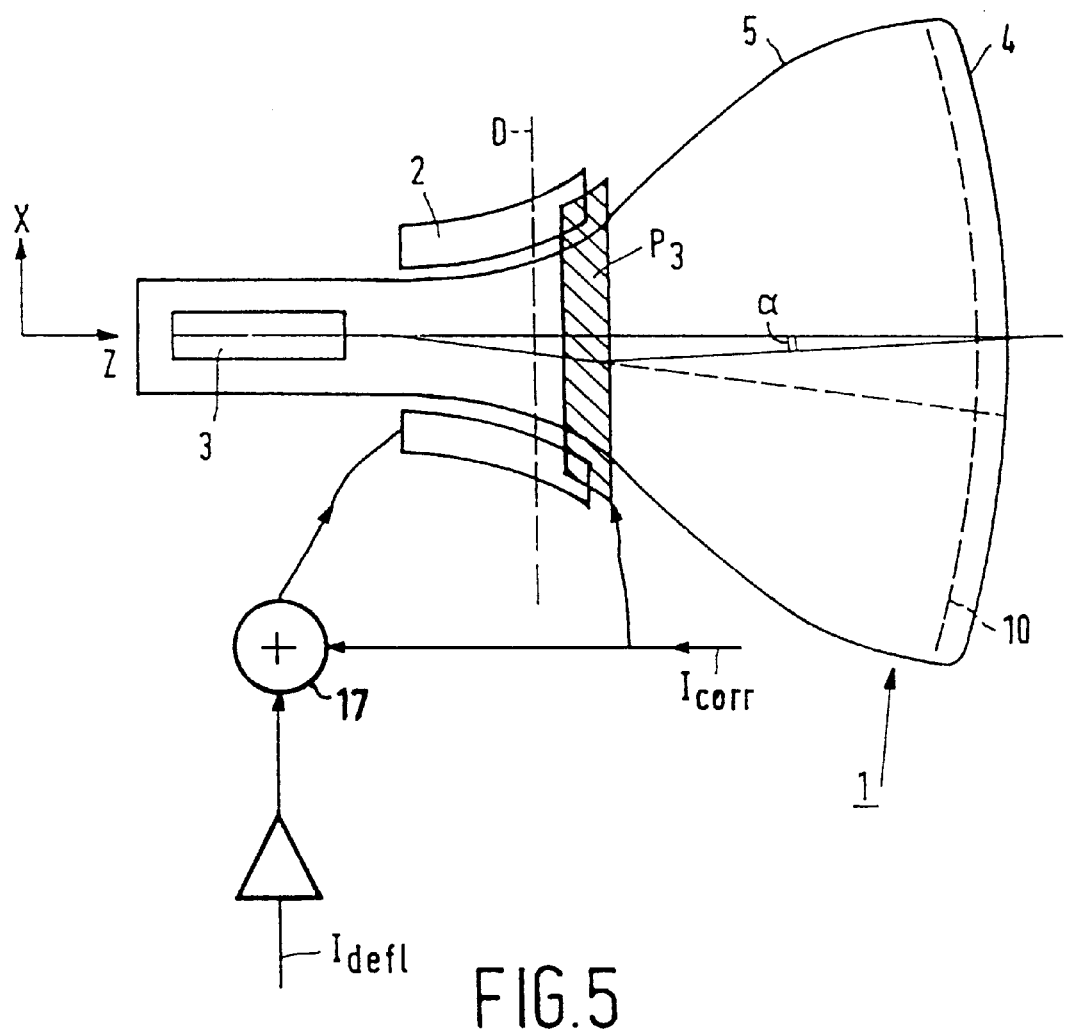
FIG. 5 shows diagrammatically the principle of the invention when using one extra dipole coil system and correction in the deflection unit.

An embodiment of the principle of the invention, in which the function of one of the dipole coil systems is fulfilled by (an extra modulation in) the deflection unit (for example, in the line deflection coil system), will be explained with reference to FIG. 5.

A display tube 1 with a display screen 4 is provided with a deflection unit 2 and an electron gun 3 for generating three electron beams. The deflection unit 2 comprises a field deflection coil system and a line deflection coil system (both not shown). The line deflection coil system is connected to a line deflection circuit 17. A dipole deflection coil system P3, P4 (only P3 is visible) is arranged at the screen side of the deflection unit 2.

A landing-correction signal is applied to the correction coil system P3, P4 and to the line deflection circuit 17, such that the electron beams are first deflected away from the longitudinal tube axis and subsequently towards this axis (or conversely).

Figure 6:
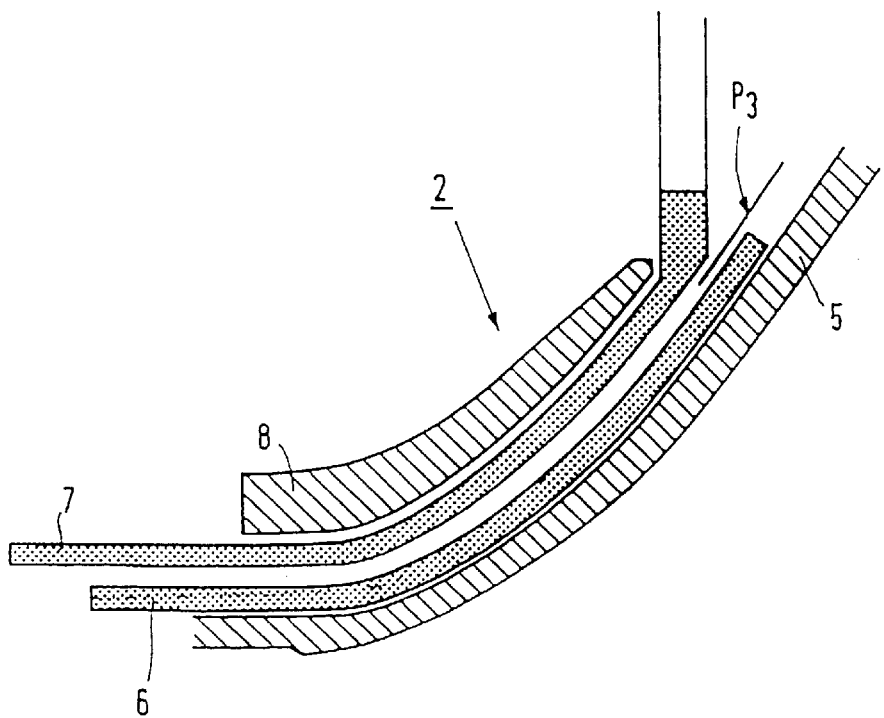
FIG. 6 is a cross-section of an embodiment of the position of the extra dipole coil system shown in FIG. 2.

The following items are important in this embodiment:
1) The position of the extra dipole should be chosen to be such that detrimental side effects are minimized as much as possible. To optimally achieve this, it appears that the dipole should be placed rather far towards the screen side. An example is shown in FIG. 6 (see P3). However, the sensitivity of the extra dipole is also important. To maximize the sensitivity, it appears that the extra dipole should preferably be arranged near the gun side of the deflection unit. If the aspect of sensitivity is most important in a given practical situation, the extra dipole should be placed near the gun side. If the aspect of detrimental side effects is most important, then the extra dipole should be arranged near the screen side. A compromise is given by placing the extra dipole in between.
2) The distance between the deflection coil and the dipole should preferably be as large as possible (then a relatively small extent of energization is necessary for a given landing-correction).
3) The side effects can still be corrected, not by making a genuine dipole but by adding 6-pole (and possibly even 10 and 14-pole) components.

FIG. 6 shows diagrammatically, by way of a cross-section, the position of extra dipole coil systems P3, P4 in a given embodiment. Here, P3 (and also P4) are arranged just in front of the field deflection coil system 7 at the outer side of the line deflection coil system 6.

The correction signal which is applied to the "double dipole coil system" can be derived in different manners. This will be explained with reference to FIG. 7.

Spread errors produced by assembly of the various tube components can be measured in advance (referred to as cold landing-measurement) and stored in a memory. A correction signal, which is a function of the position on the screen (F(x,y)), is applied synchronously with the beam deflection signals $H_d$, $V_d$ to an amplifier 11 which energizes the dipole coil systems.

Similarly, a correction signal from a doming predictor (f(x,y,t)) can be applied, or a correction signal derived from one or more sensors measuring one or more components of the earth's magnetic field (for example, xy into the 2-pole-x system for the correction of lateral field influence on x-landing). For example, the doming predictor f (x,y,t) can be derived from a local doming calculating circuit. The circuit may be relatively simple. It is sufficient to analyze the four screen quadrants. For each quadrant a correction signal f (x,y,t) can be generated with a fixed shape (e.g. a half sawtooth, increasing linearly from the screen centre towards east or west, up to about ⅔ east/west, and then smoothly deceasing to zero at the east/west screen edge). The amplitude of each quadrant correction signal f (x,y,t) is varied according to the screen peak loud in the quadrant (which can be measured or calculated from the video signals) over a period of 30 seconds.

Figure 7:
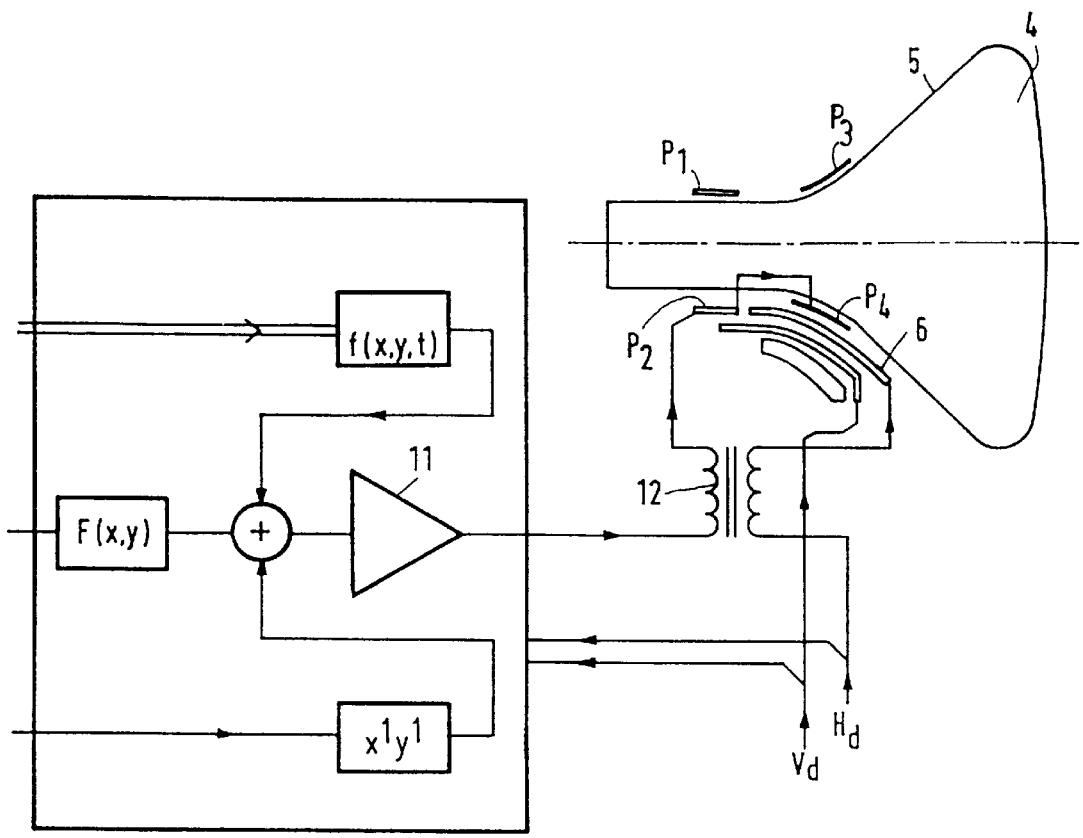
FIG. 7 is a diagram of a picture display device in which the invention is used.

It is advantageous to control the dipole deflection coil systems P1, P2 and P3, P4 in series, as is shown in FIG. 7.

A trafo 12 may be used to eliminate possible coupling between the line deflection coil system and the 2-pole-x deflection coil systems and/or between the field deflection system and the 2-pole-y system. When a controllable trafo is used (which can be advantageously integrated with the deflection unit), it is possible to adjust the coupling at zero. However, it is possible to prevent the use of a trafo (for the double dipole) so as to compensate the coupling with the line deflection coil. In principle, this is possible by arranging the two dipoles in such a way with respect to the line deflection coil 6 that they are to the same extent coupled with the line deflection coil. The way in which the two dipoles are arranged in series (such that their effects on the beam have opposite senses) renders the total coupling zero. This is achieved when the two dipoles P1, P2 and P3, P4 are arranged at an approximately equally overlapping extent with the line deflection coil 6. This situation is shown diagrammatically in FIG. 4.

By rapidly varying the correction signal to be applied with respect to time, the correction may be dependent on the screen position. This provides the choice of taking many screen points or fewer screen points (for example, one adjustment per quadrant). For a correction at many screen points, the bandwidth of the correction signal is, for example, a number of times the (line) deflection frequency, for example, approximately 3×32 kHz (approximately 100 kHz).

Up to a maximum of approximately 40 μm landing-correction, it is found that for a TV cathode ray tube a negligible side effect on the geometry (raster) and convergence occur when using the double dipole deflection coil system according to the invention, in which the landing of the three electron beams for the three colors is influenced to an equal extent by means of one electric signal applied to the double dipole.

Fields of Application of the First Aspect of the Invention

The invention is applicable to all types of color display tubes. The above description is mainly based on an x landing-correction by means of x dipoles. Thus, the invention may be used in a line mask tube.

In tubes in which the y-landing also plays a role, such as tubes having a hexagonal mask, advantageously two y-dipoles can be used in accordance with the second aspect of the invention. In such embodiments the color display device comprises a color display tube provided with a deflection unit, and an electron source for generating three electron beams, a phosphor screen and an interpositioned shadow mask, and further comprising means for correcting landing-errors, and is characterized in that the correction means comprise first and second correction deflection devices which are arranged one behind the other in the direction of the electron beams and are energizable in opposite senses so that the first correction deflection device generates a dipole field deflecting the three electron beams away from the in-line plane, and the second correction deflection device generates a dipole field deflecting the three electron beams towards the in-line plane, or conversely. In such tubes, therefore, two y-dipoles are generated in operation where the first y-dipole field deflects the electron beams away from the in-line plane, and the second y-dipole deflects the three electron beams towards the in-line plane, or conversely.

A y-dipole is a dipole field deflecting the electron out of the x-z plane, which plane corresponds to the so-called in-line plane for electron guns generating three in-line electron beams. Opposing y-dipoles deflect the electron beams above and below said plane or conversely, whereby a y landing correction is effected. The first dipole bends the electron beams out of the plane, and the second bends them back towards the plane.

Consequently the beams land on the correct screen position, but at a different corrected landing angle in the y-direction. The position of coils to generate y-dipoles is similar (in the z-direction) to the coils $P_1$ to $P_4$ as shown in FIGS. 1 to 8. The position of the coils is approximately a quarter turn (=90°) rotated in respect of said coils $P_1$ to $P_4$. An alternative to performing y-landing corrections by means of a double y-dipole coil system is to have the function of one of the y-dipole coils system fulfilled by an extra modulation of the current in the vertical (field) deflection coil itself. The vertical (field) deflection coil is not drawn in the figures, but is well known.

Preferably, the two aspects of the invention are combined, i.e. the first and second correction deflection devices comprise a system to generate opposing x and y dipoles.

In terms of causes for landing-errors, the invention can be used for correcting the consequences of one or more error sources mentioned in the opening paragraph, that is, as spread error correction and/or as ambient field correction and/or as doming correction.

In terms of utilizing the advantage, the invention may be used for:

a) enhancing the luminance (higher matrix transmission due to smaller guardband)

b) greater ambient field variation admissible ("worldwide magnetic": one tube type for different places on earth, instead of four or five);

c) better doming performance;

d) less costly mask material (iron instead of invar);

e) increasing the beam current (by means of doming correction, it is possible to ensure that discoloration due to landing-errors remains acceptable).

ad a)

To be able to use a sufficiently smaller guardband for the purpose of enhancing the luminance, it is recommended to carry out a "cold" landing-correction (one adjustment from the doming predictor f (x,y,t) per quadrant) plus a correction of the influence of the earth's vertical magnetic field. These adjustments may be performed once. Experiments have shown that by using such a simple local doming predictor, a 50% higher brightness could be achieved before coloration occurs with a double coil system. Even when landing corrections of 50 μm are to be applied the corresponding raster and convergence errors are negligible.

The dipole coil systems for the landing-angle correction for the x- and/or y-direction may comprise coils which are toroidally wound on an (annular) core, or they may comprise coils of the saddle type. In the latter case, the coils may be made (wound) of wire.

However, for building in, or integrating, the deflection unit in practice, it is advantageous to use coils which are provided in a printed form on an insulating foil. With a suitable distribution of the turns, it is possible for the dipole systems to generate a six, and/or ten, and/or fourteen-pole field component, if desired. In the above given examples embodiments of the invention having dipole systems (2-pole x and/or 2-pole-y systems) are described. In embodiments of the invention, image, a quadruple system can be added to the display device.

Figure 9A:
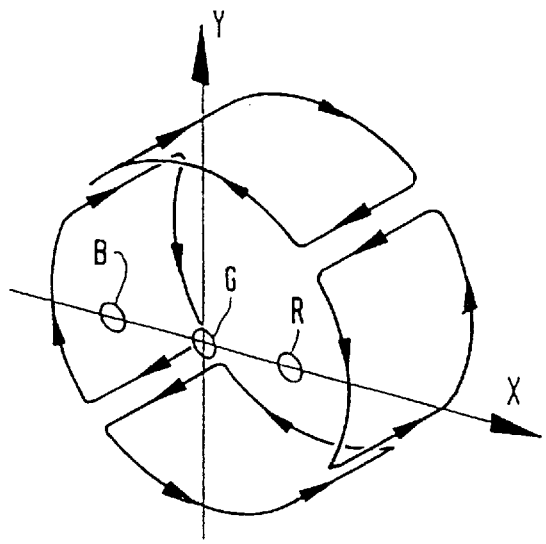
FIGS. 9A to 9D show schematically a 4-pole-x system and a 4-pole-y system.
Figure 9B:
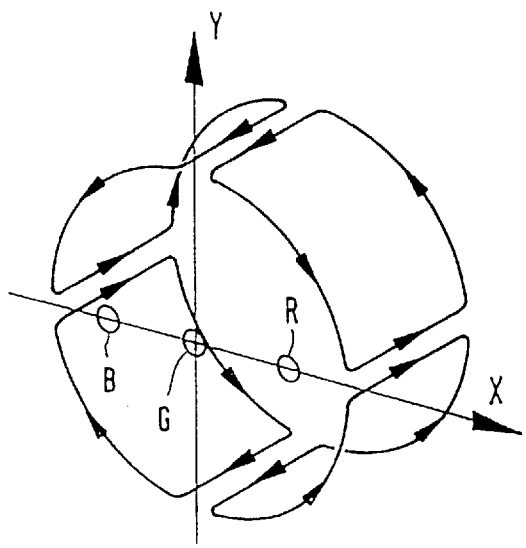
Figure 9C:
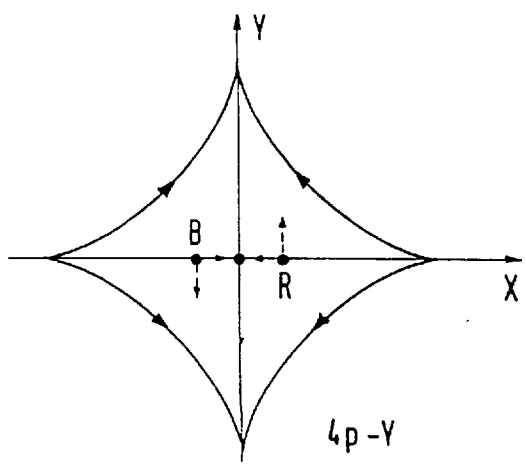
Figure 9D:
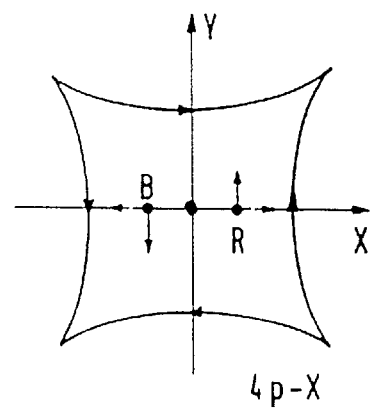
Figure 10:
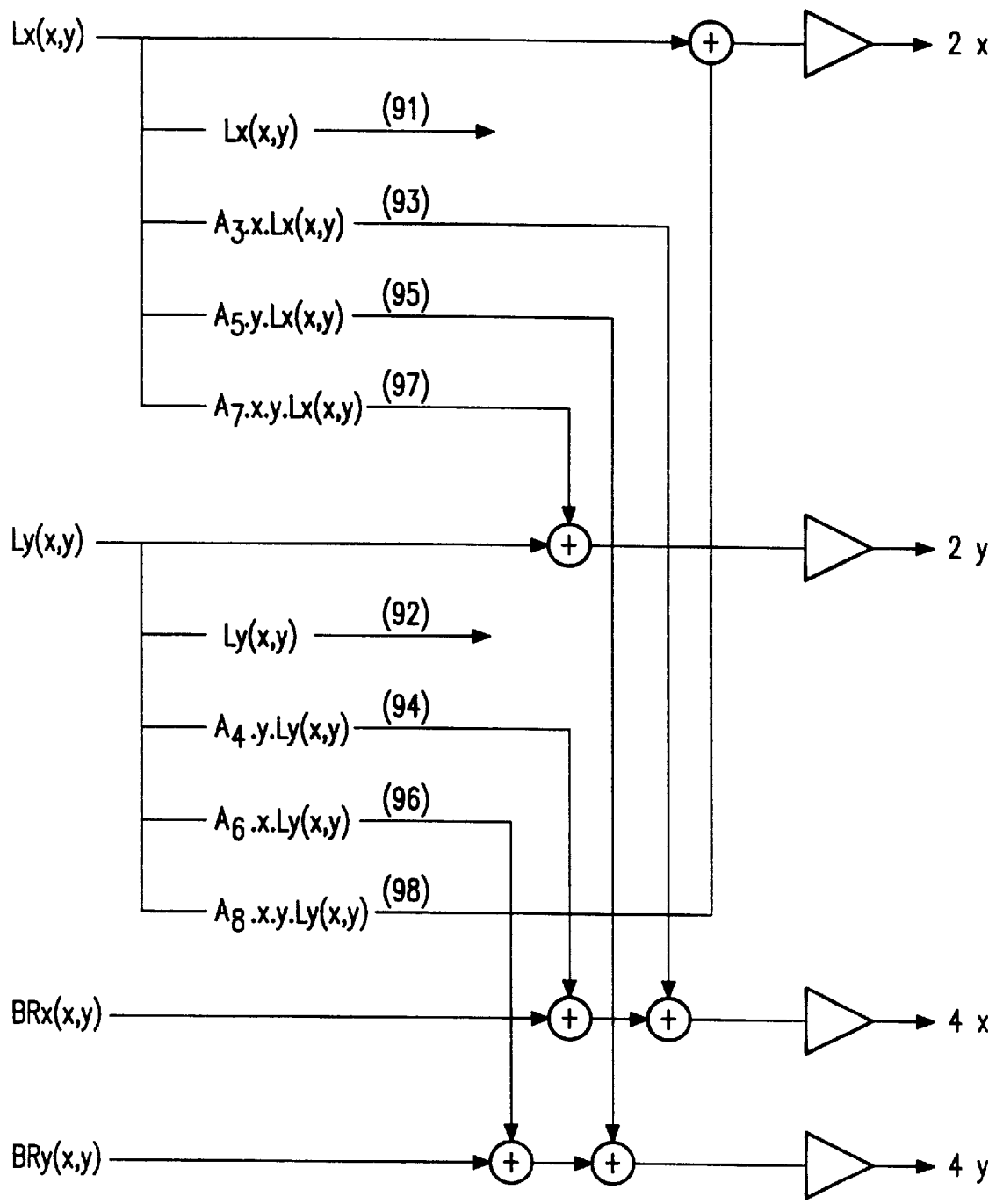
FIG. 10 shows schematically a driving scheme.

Such system generates quadrupolar magnetic fields, is used to correct convergence errors, is usually placed around the neck, and/or on the end of the deflection unit facing the electron gun and usually comprise four coils. FIGS. 9A to 9D show schematically a 4-pole-y system (FIGS. 9A and 9C) and a 4-pole-x-system (FIGS. 9B and 9B). The three in-line electron beams are surrounded by four coils, as is shown in FIGS. 9A and 9C. Said coils generate quadrupolar magnetic fields as shown in FIGS. 9C and 9D. Said fields change the convergence of the electron beams as shown in FIGS. 9C and 9D. For more detailed information reference is made to published European Patent Application No. 0 600 540, which described a convergence correction device. Preferably the color display device comprises means to provide a correction signal for x-landing correction to the 2-pole-x coil system, and deriving from said signal a signal to be provided to the 2-pole-y coil system and/or to the 4-pole-x system and/or the 4-pole-y system. FIG. 10 shows schematically a driving scheme for the different 2-pole-x, 4-pole-x, 2-pole-y and 4-pole-y systems.

FIG. 10 shows signal Lx(x,y) provided to the first 2-pole-x-system (for instance the system comprising coils P1 and P2). The signal Lx(x,y) is a signal dependent on the deflection in the x- and in the y-direction and influencing the deflecting in the x-direction. The same or a similar signal (line 91) is provided to the second 2-pole-x system (coils P3 and P4) or, alternatively, to the horizontal deflection coil. Because there is some disturbing influence of the 2-pole-x-system on the x-convergence a signal derived from the signal Lx(x,y), for instance a signal equivalent to A3.x.Lx(x,y), is provided to the 4-pole-x-system (line 93). In this example A3 is a constant and x stands for the amount of deflection in the x-direction. Because there is some disturbing influence of the 2-pole-x-system on the y-convergence a signal derived from the signal Lx(x,y), for instance a signal equivalent to A5.y.Lx(x,y), is provided to the 4-pole-y-system (line 95). In this example A5 is a constant and y stands for the amount of deflection in the y-direction. The two-pole x system can have a disturbing influence on the positions of the beams in the y-direction causing raster errors in the y-direction. Within an embodiment of the invention this disturbing influence is correctable by means of supplying a signal A7.x.y.Lx(x,y) to only one of the 2-pole y systems. In FIG. 9 this is indicated by line 97. Preferably this 2-pole y system is the system being closest to the deflection plane D.

FIG. 10 shows also a signal Ly(x,y) provided to the first 2-pole-y-system (for instance a system comprising coils similar to coils P1 and P2, but at a position 90 degrees rotated). The signal Ly(x,y) is a signal dependent on the deflection in the x- and in the y-direction and influencing the deflecting in the y-direction. The same or a similar signal (line 92) is provided to the second 2-pole-y system (coils similar to coils P3 and P4, but at a position 90 degrees rotated) or, alternatively, to the vertical deflection coil. Because there is some disturbing influence of the 2-pole-y-system on the x-convergence a signal derived from the signal Ly(x,y), for instance a signal equivalent to A4.y.Ly(x,y), is provided to the 4-pole-x-system (line 94). In this example A4 is a constant and y stands for the amount of deflection in the y-direction. Because there is some disturbing influence of the 2-pole-y-system on the y-convergence a signal derived from the signal Ly(x,y), for instance a signal equivalent to A6.x.Ly(x,y), is provided to the 4-pole-y-system (line 96). In this example A6 is a constant and x stands for the amount of deflection in the x-direction. The two-pole y system can have a disturbing influence on the positions of the beams in the x-direction causing raster errors in the x-direction. Within an embodiment of the invention this disturbing influence is correctable by means of supplying a signal A8.x.y.Ly(x,y) to only one of the 2-pole x systems. In FIG. 9 this is indicated by line 98. Preferably this 2-pole x system is the system being closest to the deflection plane D. To the 4-pole-x system an additional signal BRx(x,y) can be supplied to correct other errors. To the 4-pole-y system an additional signal BRy(x,y) can be supplied to correct other errors. FIG. 10 shows an intricate system with which the side effects of the 2-pole-x-system and the 2-pole-y-system on position and convergence can be corrected. Depending on the seriousness of the side effects some, most, or all of the signals 92 to 98 could be zero (i.e. A3=0, A4=0 etc.).

FIG. 10 shows in abstract form that, within preferred embodiments of the invention, the deflection unit has a double two-pole x system and/or a double two-pole y-system, and means to counteract image errors induced by the double two-pole x or y systems. Convergence errors can be counteracted by means of adding a four-pole x-system and/or a four-pole y system to the cathode ray tube and supplying said systems with a signal derived from the signal supplied to said 2-pole systems (Lx(x,y) and/or Ly(x,y)). Raster errors can be corrected by supplying to one of the 2-pole-y coils a signal derived from the signal supplied to the 2-pole-x system and/or vice versa.

In case the signal supplied to the 2-pole-x system is a signal which is proportional to the signal supplied to the horizontal deflection coil, which signal is conventionally a saw-tooth-like signal, feeding signal "91" into the horizontal deflection coil can be done in an easy and cheap way, simply by multiplying the signal supplied to the horizontal deflection coil by a constant.

In case the signal supplied to the 2-pole-y system is a signal which is proportional to the signal supplied to the vertical deflection coil, which signal is conventionally a saw-tooth-like signal, feeding signal "92" into the vertical deflection coil can be done in an easy and cheap way, simply by multiplying the signal supplied to the vertical deflection coil by a constant.

Figure 11:
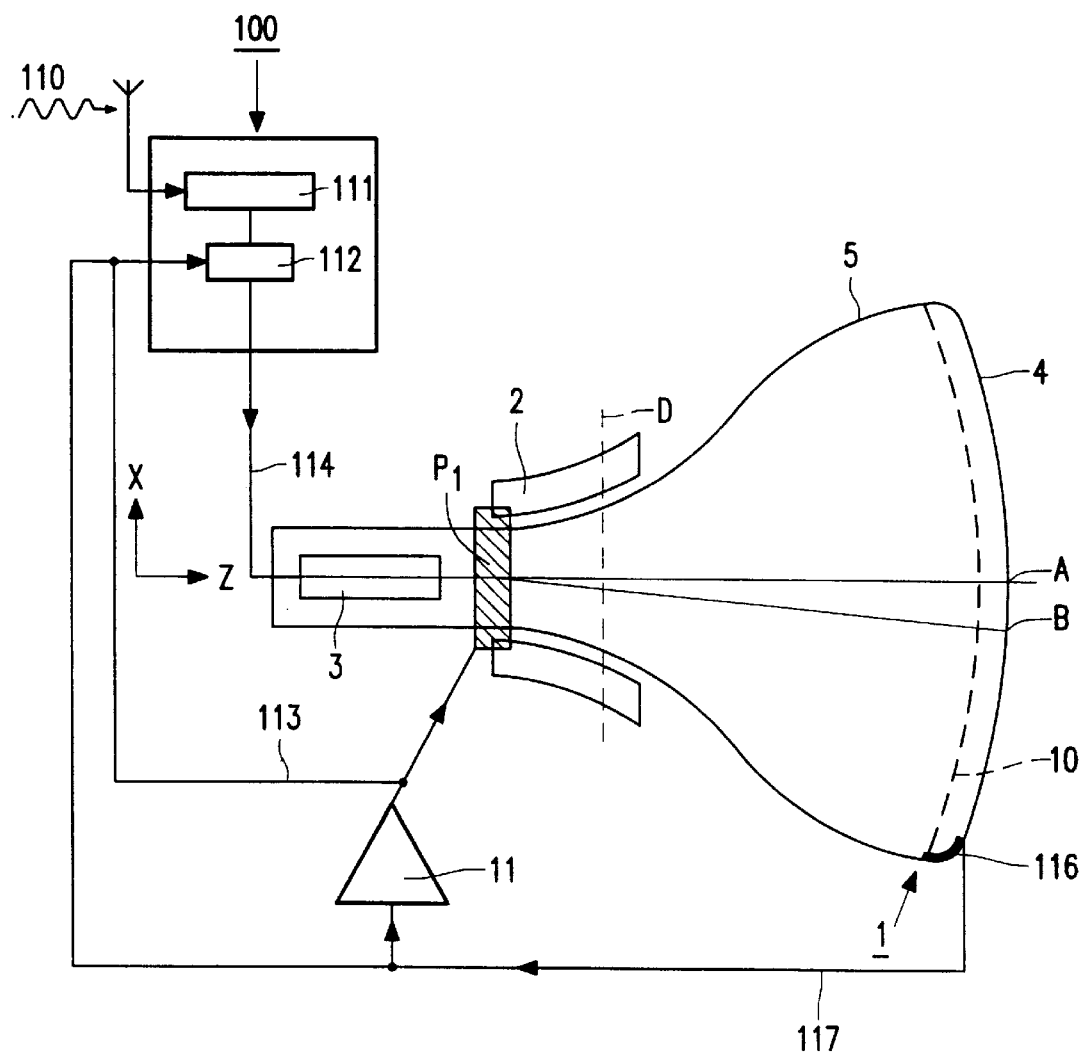
FIG. 11 shows a display device in which the video shift option is implemented.

FIG. 11 shows schematically an embodiment of the invention in which the video shift option is used. The display device comprises a means 100 to supply a video signal 114 to the means (3) for generating three electron beams. The device further comprises a 2-pole x, and/or a two-pole y coil system P1, and means 11 to supply a signal to the system P1. The system P1 generates an extra deflection of the electron beams, which without said extra deflection would land at point A. Due to the extra deflection the electron beams land at point B. The means to supply a video signal are coupled to means to receive an incoming signal. In this example the incoming signal is received by an antenna. However, the incoming signal could also be a signal from a cable or from a computer. The incoming signal is stored in a video memory 111. If the signal was sent to the means 3 without any change the picture at position B would be the picture which was intended to be shown at position A. A shift or distortion of the image would be the result. However, by delaying the video signal 114 it is possible to remove this distortion. To this end the means 100 comprise a delay system 112, which in this example delays (or advances) the video signal in time, the delay (advance time) being dependent on the deflection caused by the 2-pole x or y system. The dependence could be done implicitly, i.e. the delay system works without input from the 2 pole x or y system. If the effects of the 2-pole y or x-system are known, then the required delay time is known and could be programmed into the delay system. Alternatively, as is shown in FIG. 11, the delay system operates in dependence on a signal 113 which is derived from the signal supplied to the system P1. Yet another alternative is formed by measuring the extra deflection caused by the system P1, P2 at a number of points of the screen, for instance by means of measuring devices 116 around the circumference of the screen, and supplying this information via signals 117 to the delay device 112. The video shift option can be used for a 2-pole x-system and/or for a 2-pole y-system. It is also possible to use the video shift option for a 2-pole-x system and use a double dipole y-system.

I claim:

1. A color display device comprising a color display tube having an axis, said tube including:
    a. an electron gun for producing three in-line electron beams comprising a central first electron beam and outer second and third electron beams;
    b. a screen having respective areas for luminescing in first, second and third colors when impinged upon by respective ones of the first, second and third electron beams;

c. an apertured shadow mask disposed adjacent the screen;
d. a deflection coil arrangement for deflecting the electron beams across the shadow mask, said deflection coil arrangement defining a deflection plane;
e. correction means for correcting beam-landing errors at the screen, said correction means including:
   (1) a correction coil arrangement disposed for deflecting the first, second and third electron beams away from the axis before entering the deflection plane; and
   (2) circuitry for time-shifting a video signal applied to the electron gun to compensate for said deflection of said electron beams away from said axis by the correction coil arrangement.

2. The color display device as claimed in claim 1 wherein the correction coil arrangement comprises a correction coil deflection device mounted on the color display tube and which produces a dipole magnetic field which simultaneously deflects the first, second and third electron beams.

3. The color display device as claimed in claim 1 wherein said circuitry comprises a delay means.

4. The color display device as claimed in claim 3 wherein the delay means is controlled dependent upon a signal that is determined by measuring the deflection of the electron beams at one or more points on the screen and which is effected by the correction coil arrangement.

5. A color display device comprising a color display tube having an axis, said tube including:
a. an electron gun for producing a central first electron beam and outer second and third electron beams;
b. a screen having respective areas for luminescing in first, second and third colors when impinged upon by respective ones of the first, second and third electron beams;
c. an apertured shadow mask disposed adjacent the screen;
d. a deflection coil arrangement for deflecting the electron beams across the shadow mask;
e. correction means, including at least one correction coil arrangement, for affecting the respective angles at which the first, second and third electron beams pass through the shadow mask to correct beam-landing errors at the screen and where, in operation, the deflection coil arrangement defines a deflection plane, said correction means comprising:
   a. a first correction coil arrangement disposed for deflecting the electron beams away from the axis before entering the deflection plane; and
   b. a second correction coil arrangement disposed for deflecting the electron beams toward the axis after leaving the deflection plane.

6. A color display device as in claim 5 where the first and second correction coil arrangements produce dipole fields.

7. A color display device as in claim 5 where the second correction coil arrangement comprises a part of the deflection coil arrangement.

8. A color display device as in claim 5 where at least one of the first and second correction coil arrangements comprises a plurality of saddle coils which are provided in printed form on an insulating foil.

9. A color display device as in claim 5 where, in operation, a signal is supplied to the first correction coil arrangement which is proportional to an x-direction deflection signal and *a signal is supplied to the second correction coil arrangement which is proportional to a y-direction deflection signal.

10. A color display device as in claim 5 where at least one of the first and second correction coil arrangements, in operation, produces a quadrupole field.

11. A color display device as in claim 5 where at least one of the first and second correction coil arrangements, in operation, produces a six-pole field.

12. A color display tube having an axis and comprising:
an electron gun for generating first, second and third electron beams,
a screen having respective areas for luminescing in first, second and third colors when impinged upon by respective ones of the first, second and third electron beams,
an apertured shadow mask disposed adjacent the screen and interpositioned between the electron gun and the screen,
a deflection coil arrangement on the display tube for deflecting the electron beams across the shadow mask, and
correction means for correcting beam-landing errors, wherein the correction means comprises a correction deflection system for generating a magnetic field transversely to the axis of the color display tube for correcting beam-landing errors by influencing the respective angles at which the first, second and third electron beams pass through the shadow mask, and means for correcting errors introduced by the correction deflection system; said correction means comprising first and second x-correction deflection devices arranged one behind the other in the direction of the tube axis and energizeable in opposite senses so that the first correction deflection device generates a dipole field for deflecting the three electron beams away from the tube axis, and the second x-correction deflection device generates a dipole field for deflecting the three electron beams toward the tube axis, or conversely.

13. A color display tube having an axis and comprising:
an electron gun for generating first, second and third electron beams,
a screen having respective areas for luminescing in first, second and third colors when impinged upon by respective ones of the first, second and third electron beams,
an apertured shadow mask disposed adjacent the screen and interpositioned between the electron gun and the screen,
a deflection coil arrangement on the display tube for deflecting the electron beams across the shadow mask, and
correction means for correcting beam-landing errors, wherein the correction means comprises a correction deflection system for generating a magnetic field transversely to the axis of the color display tube for correcting beam-landing errors by influencing the respective angles at which the first, second and third electron beams pass through the shadow mask, and means for correcting errors introduced by the correction deflection system; said electron beams defining an in-line plane, and said correction means comprising first and second y-correction deflection devices which are arranged one behind the other in the direction of the tube axis and energizeable in opposite senses so that the first y-correction deflection device generates a dipole field for deflecting the three electron beams away from the in-line plane, and the second y-correction deflection device generates a dipole field for deflecting the three electron beams towards the in-line plane, or conversely.

14. A color display tube having an axis and comprising:

an electron gun for generating first, second and third electron beams, a screen having respective areas for luminescing in first, second and third colors when impinged upon by respective ones of the first, second and third electron beams, an apertured shadow mask disposed adjacent the screen and interpositioned between the electron gun and the screen, a deflection coil arrangement on the display tube for deflecting the electron beams across the shadow mask, and correction means for correcting beam-landing errors, wherein the correction means comprises a correction deflection system for generating a magnetic field transversely to the axis of the color display tube for correcting beam-landing errors by influencing the respective angles at which the first, second and third electron beams pass through the shadow mask, and means for correcting errors introduced by the correction deflection system; said correction means comprising:

an x-correction deflection device comprising a dipole coil device, and wherein the deflection coil arrangement includes a line deflection coil in which the current flow therein receives an extra modulation such that the line deflection coil operates as a further correction deflection device for the three electron beams.

15. The color display tube as claimed in claim 14 further comprising means for supplying a correction signal to the x-correction deflection device which is proportional to a deflection signal supplied to the line deflection coil.

16. A color display tube having an axis and comprising:

an electron gun for generating first, second and third electron beams, a screen having respective areas for luminescing in first, second and third colors when impinged upon by respective ones of the first, second and third electron beams, an apertured shadow mask disposed adjacent the screen and interpositioned between the electron gun and the screen, a deflection coil arrangement on the display tube for deflecting the electron beams across the shadow mask, and correction means for correcting beam-landing errors, wherein the correction means comprises a correction deflection system for generating a magnetic field transversely to the axis of the color display tube for correcting beam-landing errors by influencing the respective angles at which the first, second and third electron beams pass through the shadow mask, and means for correcting errors introduced by the correction deflection system; said correction means comprising:

a y-correction deflection device comprising a dipole coil device, and wherein the deflection coil arrangement includes a field deflection coil in which the current flow therein receives an extra modulation such that the field deflection coil operates as a further correction deflection device for the three electron beams.

17. The color display tube as claimed in claim 16 further comprising means for supplying a correction signal to the y-correction deflection device which is proportional to a deflection signal supplied to the field deflection coil.

* * * * *